(12) United States Patent
Zapp

(10) Patent No.: US 6,378,549 B1
(45) Date of Patent: Apr. 30, 2002

(54) FUEL TANK

(75) Inventor: Thomas Zapp, Dortmund (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/649,980

(22) Filed: Aug. 29, 2000

(30) Foreign Application Priority Data

Sep. 10, 1999 (DE) .......................... 199 43 260

(51) Int. Cl.⁷ .......................... F16L 33/00; F16L 31/00
(52) U.S. Cl. .............................. 137/315.01; 137/68.14; 138/109; 285/4; 285/15
(58) Field of Search .................... 137/15.01, 15.08, 137/15.09, 315.01, 68.11, 68.14; 138/97, 100, 109; 285/2, 3, 15, 4; 29/402.08, 402.09

(56) References Cited

U.S. PATENT DOCUMENTS

| | | | | |
|---|---|---|---|---|
| 481,192 A | * | 8/1892 | Noll ........................... | 138/100 |
| 1,558,503 A | * | 10/1925 | Pressler ........................... | 285/3 |
| 1,921,809 A | * | 8/1933 | Crain ............................. | 285/3 |
| 3,875,970 A | * | 4/1975 | Fitter ........................ | 138/110 |
| 3,895,177 A | * | 7/1975 | Muslin ....................... | 138/109 |
| 4,630,630 A | * | 12/1986 | Reynolds et al. ............. | 285/4 |
| 4,828,557 A | * | 5/1989 | Persidsky ................... | 285/369 |
| 4,872,471 A | * | 10/1989 | Schneider ................ | 137/68.14 |
| 5,050,911 A | * | 9/1991 | Morrison ....................... | 285/2 |
| 5,250,041 A | * | 10/1993 | Folden ..................... | 137/68.14 |
| 5,884,669 A | * | 3/1999 | Braun ........................ | 138/109 |

* cited by examiner

*Primary Examiner*—George L. Walton
(74) *Attorney, Agent, or Firm*—Richard A. Speer; Mayer Brown Rowe & Maw

(57) ABSTRACT

In the case of a fuel tank for a motor vehicle, a filling pipe (2), which is welded to a tank chamber (1), has a section (3) provided for the separation. The section (3) provided for the separation is adjoined by regions for the attachment of a connecting part. This enables the tank chamber (1) to be taken out of the motor vehicle and to be subsequently refitted without removing the entire filling pipe (2).

7 Claims, 2 Drawing Sheets

FUEL TANK

BACKGROUND OF THE INVENTION

The invention relates to a fuel tank having a filling pipe arranged on a tank chamber, it being possible for the filling pipe to be separated from the tank chamber and to be reconnected thereto.

Fuel tanks of this type are frequently used in today's motor vehicles and are known in practice. The filling pipe of the fuel tank known in practice is connected to the tank chamber via a shaped tubing. For maintenance, for example, of components of a fuel conveying unit which are arranged in the tank chamber, after the shaped tubing is detached the tank chamber can be removed separately from the filling pipe. The separation of the tank base from the filling pipe, which is generally configured such that it is very protruding, has the advantage that when the tank chamber is removed, complicated removal, for example of the rear axle of the motor vehicle, can generally be avoided. A disadvantage of the known fuel tank is that fuel vapors can pass through the point where the shaped tubing is connected to the filling pipe and the tank chamber and into the environment.

The invention is based on the problem of configuring a fuel tank of the type mentioned at the beginning in such a manner that it largely prevents fuel vapors from escaping into the environment.

According to the invention, this problem is solved by the tank chamber and the filling pipe being manufactured or welded as a single piece, and by the unit comprising the filling pipe and tank chamber having a section, which is provided for the separation, and by being configured in the regions adjacent to said section for the attachment of a connecting part.

This configuration means that the fuel tank according to the invention does not have any points of connection between the tank chamber and the filling pipe in the novel state. However, the connection of the unit comprising the tank chamber and filling pipe can be separated, for maintenance of the fuel tank according to the invention, and the tank chamber can be removed easily. The components are subsequently connected to one another by means of a connecting part. In the novel state of the fuel tank escape of fuel from the fuel tank is reliably avoided. In the unlikely case of maintenance being carried out, the fuel tank according to the invention, like the known fuel tank, has sealing points on the connecting part. By this means, escape of fuel from the fuel tank according to the invention is largely avoided. The manufacture of the tank chamber together with the filling pipe as a single piece can take place by them being manufactured in a common mold or by welding or bonding.

According to another advantageous development of the invention, a compensation of tolerance between the separated regions can be achieved in a simple manner if the connecting part is designed as a piece of tubing.

According to an advantageous development of the invention, the unit comprising the filling pipe and tank chamber can be separated in a simple manner if the unit comprising the filling pipe and tank chamber has a circumferential groove in the section provided for the separation. A further advantage of this configuration resides in the fact that the groove serves as a marking and therefore reduces the risk of erroneous separation which may then result in an erroneous fit of the connecting part.

According to another advantageous development of the invention, reliable retention of the connecting part can be ensured in a simple manner if the unit comprising the filling pipe and tank chamber has, on its outside, circumferential, radially protruding projections for the attachment of the connecting part. The seal-tightness of the fuel tank is also increased by means of the projection.

According to another advantageous development of the invention, a collision of ends produced by separating the unit comprising the filling pipe and tank chamber can be reliably avoided if the unit comprising the filling pipe and tank chamber has two spaced apart points of separation, and if the points of separation are each adjacent, on their sides facing away from each other, to a region provided for the attachment of the connecting part. By this means, the connecting part spans a region separated from the fuel tank and serves as a spacer and as a means of compensating for tolerance between the points of separation.

According to another advantageous development of the invention, a compensation for tolerance between the tank chamber and the filling pipe can be produced in a simple manner by the unit comprising the filling pipe and tank chamber having a bellows in the region provided for the separation.

According to another advantageous development of the invention, an arrangement of a series of elastic means provided for compensating tolerances can be avoided if the bellows is arranged between two regions provided for the attachment of the connecting part. The fuel tank thereby first of all has the bellows as a means for compensating for tolerance. In the event of maintenance, the bellows is removed and replaced by the connecting part.

According to another advantageous development of the invention, the connection of the region spanned by the connecting part is able to absorb particularly high tensile forces if the regions provided for the attachment of the connecting part have a circumferential bead, and if the connecting part is designed as a shaped tubing of a configuration corresponding to the beads.

The invention permits numerous embodiments. To further clarify its basic principle two of these are illustrated in the drawing and are described below. In the drawings.

DETAILED DESCRIPTION OF THE INVENTION

Figure 1:
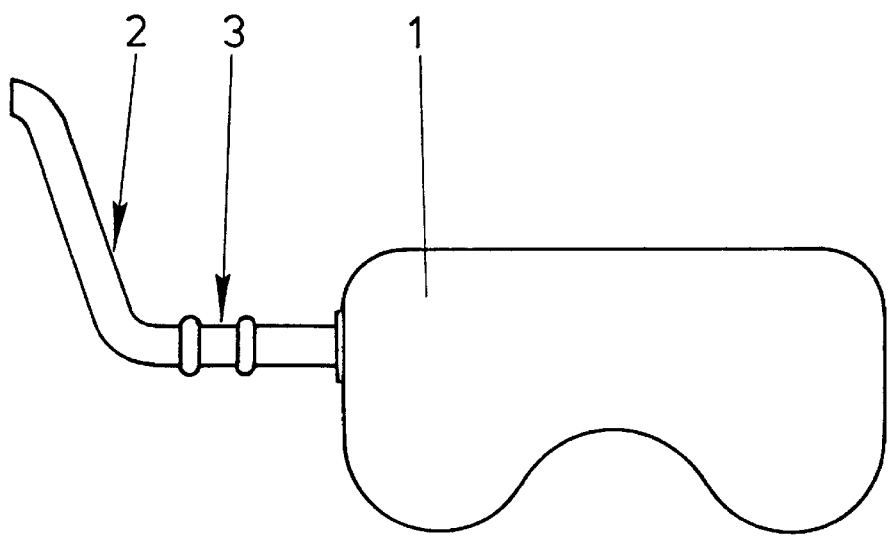
FIG. 1 shows, schematically, a fuel tank according to the invention.

FIG. 1 shows, schematically, a fuel tank having a tank chamber or body 1, for collecting fuel, and a filling pipe 2 which is welded thereto. In the vicinity of the tank chamber 1, the filling pipe 2 has a section 3 provided for the separation.

Figure 2:
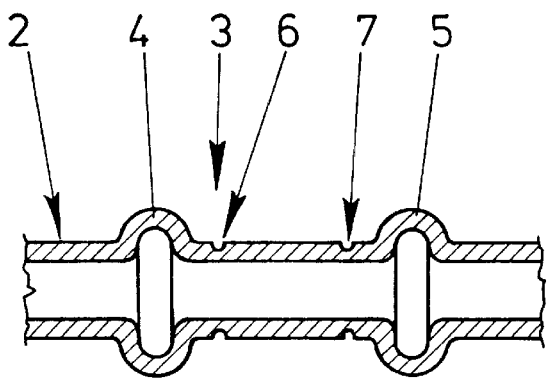
FIG. 2 shows, in longitudinal section, a section provided for the separation of a filling pipe of the fuel tank from FIG. 1.
Figure 3:
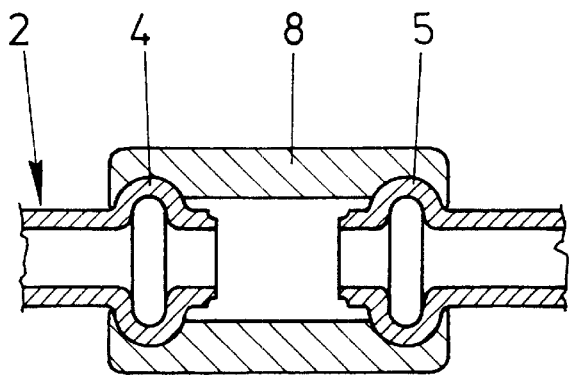
FIG. 3 shows the filling pipe from FIG. 2 after the fitting of the connecting part.

FIG. 2 shows, in longitudinal section, the filling pipe 2 in the section 3 provided for the separation. The filling pipe 2 has two beads 4, 5 adjacent to the section 3 provided for the separation. In the vicinity of the beads 4, 5, two grooves 6, 7 are arranged in the filling pipe 2. The grooves 6, 7 are regions of reduced wall thickness that delimit a length of the filling pipe 2, that can be removed if the tank chamber 1, which is illustrated in FIG. 1, is to be removed. FIG. 3 shows the section of the filling pipe 2 after the separation in the region of the grooves 6, 7 and after fitting of a connecting part 8. The connecting part 8 is designed as a shaped tubing and keeps the beads 4, 5 spaced apart. Furthermore, the connecting part 8 grips behind the beads 4, 5 and seals off the filling pipe 2.

Figure 4:
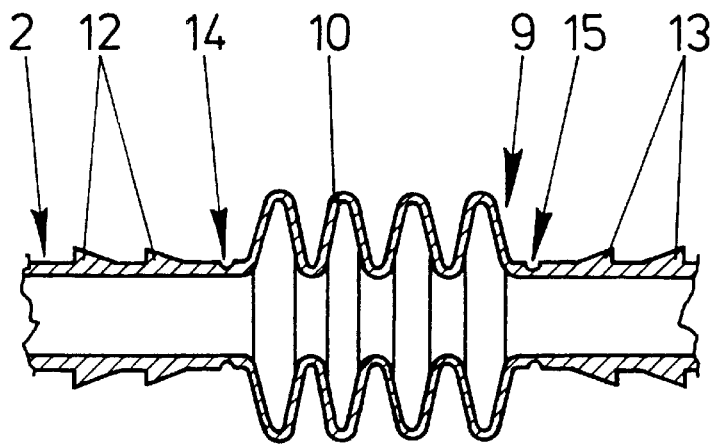
FIG. 4 shows a further embodiment of a filling pipe.
Figure 5:
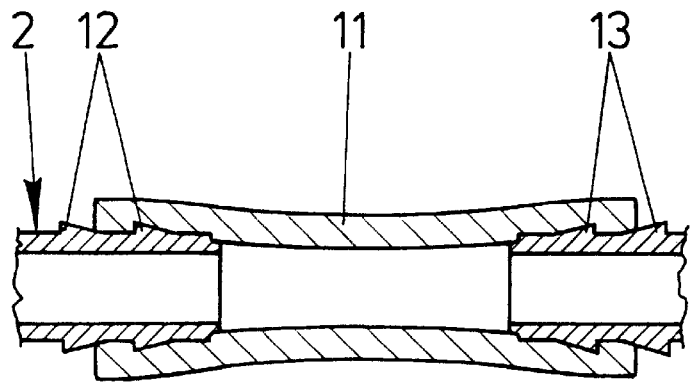
FIG. 5 shows the filling pipe from FIG. 4 after fitting of the connecting part.

FIG. 4 shows a further embodiment of the filling pipe 2 having a section 9 provided for the separation and having a bellows 10. Arranged to the sides of the bellows 10 are regions for the fitting of a connecting part 11, which is illustrated in FIG. 5. The regions for the fitting of the connecting part 11, which is designed here as a piece of tubing, have radially protruding projections 12, 13. The projections 12, 13 serve for the mechanical attachment of the connecting part 11 and the sealing of the filling pipe 2. In the vicinity of the bellows 10, the filling pipe 2 has grooves 14, 15 as a marking for the separation.

What is claimed is:

1. A fuel tank comprising:
   (a) a tank body for holding fuel;
   (b) single piece filling pipe integral with and extending from the tank body for introducing fuel into the tank body;
   (c) spaced apart regions of reduced, weakened wall thickness that delimit a length of filter pipe removable to separate the filling pipe into two parts without removal of the fuel tank; and
   (d) an enlargement adjacent each pipe region of reduced thickness outside of the removable length of filler pipe for sealably attaching a connector to the enlargements, whereby the connector replaces the length of removed filling pipe.

2. The fuel tank as defined in claim 1, wherein the enlargement for securing a connector to join the filling pipe two parts are circumferential, radially protruding projections.

3. The fuel tank as defined in claim 1, wherein the removable length of the filling pipe has bellows.

4. The fuel tank as defined in claim 1, wherein the enlargements adjacent each pipe region of reduced weakened thickness is a circumferential bead for sealably attaching the connector that replaces the length of removed filler pipe.

5. A fuel tank comprising:
   (a) A fuel tank body for holding fuel;
   (b) a single piece filling pipe integral with and extending from the fuel tank body;
   (c) means in the filling pipe for providing spaced apart regions of reduced wall strength in the filling pipe removing a preselected length thereof to separate the filling pipe into two parts, without removal of the fuel tank; and
   (d) means in the filling pipe for sealably attaching a connector that replaces the length of removed filling pipe.

6. A fuel tank as defined in claim 5 wherein the means in the filling pipe for removing a preselected length thereof are spaced apart regions of reduced wall thickness.

7. A fuel tank as defined in claim 5 wherein the means for securing a connector are spaced apart regions of increased pipe diameter.

* * * * *